United States Patent
Clark et al.

(10) Patent No.: US 6,393,103 B1
(45) Date of Patent: May 21, 2002

(54) METHOD AND APPARATUS FOR EMULATING TELEPHONE SERVICES

(75) Inventors: John M. Clark, Fort Worth; Ronald W. Pedigo, Trophy Club; Richard T. Carey, Fort Worth, all of TX (US)

(73) Assignee: RadioShack Corporation, Fort Worth, TX (US)

( * ) Notice: Subject to any disclaimer, the term of this patent is extended or adjusted under 35 U.S.C. 154(b) by 0 days.

(21) Appl. No.: 09/158,600

(22) Filed: Sep. 22, 1998

(51) Int. Cl.⁷ .............................. H04M 1/24; H04M 1/64
(52) U.S. Cl. ................. 379/29.02; 379/10.01; 379/26.02; 379/27.04; 379/67.1
(58) Field of Search ............................ 379/10, 34, 67.1, 379/68, 88.22, 93.12, 100.05, 157, 171, 201, 214, 279, 1.01, 9.01, 14.01, 10.01, 10.03, 11, 12, 13, 15.01, 15.03, 19, 22.03, 25, 26.01, 26.02, 27.04, 29.02, 29.01, 29.08, 29.11, 32.01, 200.01, 214.01, 215.01

(56) References Cited

U.S. PATENT DOCUMENTS

| | | | |
|---|---|---|---|
| 3,647,973 A | 3/1972 | James et al. | 379/93.27 |
| 4,344,090 A | 8/1982 | Belisomi et al. | 348/578 |
| 4,578,540 A | 3/1986 | Borg et al. | 379/40 |
| 4,817,129 A | 3/1989 | Riskin | 379/88.24 |
| 4,841,562 A | 6/1989 | Lem | 379/102.3 |
| 4,939,767 A | 7/1990 | Saito et al. | 348/14.12 |
| 5,195,064 A * | 3/1993 | Hegarty et al. | 368/272 |
| 5,459,785 A | 10/1995 | Noda | 379/386 |
| 5,548,635 A | 8/1996 | Bradley et al. | 379/102.3 |
| 5,579,377 A | 11/1996 | Rogers | 379/74 |
| 5,751,760 A | 5/1998 | Fuller et al. | 379/210 |
| 5,754,306 A * | 5/1998 | Taylor et al. | 358/400 |
| 5,799,060 A * | 8/1998 | Kennedy et al. | 379/29 |
| 5,857,011 A * | 1/1999 | Kennedy et al. | 379/32 |
| 5,870,464 A * | 2/1999 | Brewster et al. | 379/219 |
| 5,946,386 A * | 8/1999 | Rogers et al. | 379/265 |
| 5,991,374 A * | 11/1999 | Hazenfield | 379/101.01 |
| 6,161,128 A * | 12/2000 | Smyk | 709/205 |

* cited by examiner

Primary Examiner—Allan Hoosain
(74) Attorney, Agent, or Firm—William A. Linnell

(57) ABSTRACT

A method and apparatus for simulating telephony services and providing information about telephony services and products without the use of a public carrier telephone system. The system includes at least one Telephone Interface (TI), connected between a telephone and the simulation system. The emulator receives, decodes and validates a user initiated command signal, converts it into a control signal and activates a playback sequence which emulates telephone services. A plurality of different telephone functions and services can be simulated without connection to external telephone lines or wireless service.

25 Claims, 7 Drawing Sheets

| Ref. Des. | Part Category | Type | Mfg. |
|---|---|---|---|
| U3 | 6 Pin DIP | 4N37 | Motorola |
| U1 | 5V Positive Regulator | KA7805 | SGS |
| U2 | 12V Adj. Regulator | KA350-ABTU | Samsung |
| U4 | 5 Pin T0220 | LM383 | National |
| U6 | 8 Pin DIP | LM741CN | National |
| U2 | 14 Pin DIP | MC145436AP | Motorola |
| U1 | 40 Pin DIP (Standard) | Z86E4016PSE | Zilog |
| | | | |
| LI | 2 H Choke | 270-030 | Radio Shack |
| T2 | 600 Ohm Xfmr | 273-1374 | Radio Shack |
| T1 | P.A. Xfmr. | 32-1031 | Radio Shack |
| TI | 14V, 2.6A Transformer | PSS-728 | Hobart |
| T2 | 18V, .34A Transformer | PSS-436 | Hobart |
| RL1, RL2 | DPDT Relay | G6A274PSTUSDC12 | Omron |
| Fl, F2 | Fuse, 1A, Fast Acting | 19197 Series | Wickmann |
| | 3AG Fuse Clips | 111501 | Wickmann |
| | | | |
| Q1 | PNP T092 | 2N3906 | Philips |
| Q2 | NPN T092 | 2N3904 | Philips |
| D1 | Diode, 1N4148 | 810281022 | TDP STOCK |
| BRI, BR2 | Bridge Rectifier | 7030094 | TDP STOCK |
| | | | |
| R4 | 10Ω 1/2W, 5%, Axial | 5053HMIOROOJ | Philips |
| R7 | 200KΩ, 5W, 5%, Axial | M0500J200ROTR | Mutronics |
| R9 | 470Ωm 1/4W, 5% Axial | | Philips |
| R5, R10 | 3.3KΩ, 1/2W, 5%, Axial | RCF50J3K3TRR | Mutronics |
| R3, R4 | 4.7KΩ, 1/4W, 5%, Axial | 5043CX4K7ROJ | Philips |
| R11, R20 | | | |
| R17, R18 | 47KΩ, 1/4W, 5%, Axial | RCF25J47K0TRR | Mutronics |
| R15 | 1Ω, 1/4W, 5%, Axial | 5043CXIR000J | Philips |
| R13 | 220Ω, 1/4W, 5%, Axial | 5043CX220R0J | Philips |
| R12 | 5.6KΩ, 1/4W, 5%, Axial | 5043CX5K6R0J | Philips |
| R14 | 2.2Ω, 1/4W, 5%, Axial | 5043CX2R200J | Philips |
| R8 | 47Ω, 1W, 5%, Axial | 5053HM47R00J-TR | Philips |
| R2 | 1MΩ, 1/4W, 5%, Axial | 5043CX1M000J | Philips |
| R6 | TRIM POT 1KΩ, 1/2W | CT6102 | Philips |
| R2 | 237Ω, 1/4W, 1% Axial | RMF25F237R0TBR | Mutronics |
| R3 | 2.15KΩ, 1/4W, 1%, Axial | RMF25F2K15TBL | Mutronics |
| R1 | 10Ω, 10W, 5%, Axial | | |
| R15, R16 | 10KΩ, 1/4W, 5%, Axial | RCF25JI0K0TRR | Mutronics |
| R1 | TRIM POT 10KΩ, 1/2W | CT6103 | Philips |
| C5, C6 | 10001µF, 50V Electrolytic | 108CKR050M (bulk) | Illinois |
| C15 | 4.7µF, 50V Electrolytic | NRSA4R7M050V5X1ITR | NIC |
| C12 | 2200µF, 16V Electrolytic | 228CKR016M (bulk) | Illinois |
| C9, C11 | .22µF, 50V, Electrolytic | RS50VR22TR | Mutronics |
| C7 | 2.2µF, 16V Electrolytic | 225CKR050M | Illinois |

Fig. 3A

| Ref. Des. | Part Category | Type | Mfg. |
|---|---|---|---|
| C10 | 470µF, 50V Electrolytic | 477CKR050M | Illinois |
| C3, C8, C13, C18, C19 | 10µF, 35V Electrolytic | NRSA100M35V5X11 | NIC |
| C14 | 220µF, 16V Electrolytic | 227CKR016M | Illinois |
| C1, C2 | 22pF, Ceramic Disc | L5NP01B220K | Mutronics |
| C16 | 100µF, 16V Electrolytic | NRSA101M16V6.3X11 | NIC |
| C4, C20, C21 | .01µF, Ceramic Disc | H6Z5U1B103MT | Mutronics |
| C3 | 3300µF, 25V, Electrolytic | CERN-25V332M105 | Mutronics |
| C1, C2 | .33µF, 35V, Tantalum | T350A334K035AS-TR | Kemet |
| C4 | 2200µF, 50V Electrolytic | RE2-50V222MMA | Elna |
| J1 | 40-pin header | PEG-40DS-GBR | Crane |
| J2 | 4-pin power jack (male) | 770997-1 | AMP |
| J6 | 4-pin power jack (female) | 1-641737-1 | AMP |
| J4 | RJ-14 Jack | GD-A-64 | Kycon |
| J3 | 4-pin header | PEG-04SS-GBR | Crane |
| J2, J3 | 2-pin header | PEG-02SS-GBR | Crane |
| X1 | 8 Mhz | FOX080-20 | Fox |
| X2 | 3.58 Mhz | FOX036S | Fox |
|  | 6 Pin IC Socket | 42000-0610 | Molex |
|  | 8 Pin IC Socket | 42000-0810 | Molex |
|  | 14 Pin IC Socket | 42000-1410 | Molex |
|  | 40 Pin IC Socket | 42000-4030 | Molex |
|  | 4X CDROM Drive |  | Mitsumi |
|  | M3 x 5 pan head screws |  |  |
|  | Screws, Fan | 8-32x1-3/4 |  |
|  | Nuts, Fan |  |  |
|  | Standoffs for main pcb | RLCBSPR-5-01 | Richco |
|  | Screws, heat sink, pcb | 000311-0053 | TDP Stork |
|  | Pop Rivits |  |  |
|  | Dipole L-Brackets | 810271901 | TDP Stock |
|  | Backplate Screws |  |  |
|  | Backplate |  |  |
| HS1, HS2 | Heat Sink | 529802B2500 | Aavid |
|  | AC Fan | 273-242 | RadioShack |
|  | Dual Drive Case |  |  |
|  | PCB, Main Board |  |  |
|  | PCB, Power Supply |  |  |
| CB1 | 40 Pin Socket to Socket | Tandy Wire/Cable |  |
| CB2 | 4 Pin Socket to Socket | CD Audio Cable |  |
| CB4 | 2 Pin Socket to Socket | Power Cable |  |
| CB5 | Y-Power Connector | AK319-.2 | Assmann |
| CB3 | Line Cord | 4010014 | TDP Stock |

Fig. 3B

METHOD AND APPARATUS FOR EMULATING TELEPHONE SERVICES

FIELD OF THE INVENTION

This invention generally relates to telephony systems. More specifically, it is a method and apparatus for simulating telephony services and providing information to potential customers about telephony services without the use of a public carrier telephone system.

BACKGROUND OF THE INVENTION

Consumers are faced with an ever expanding universe of choices with regard to telephone services and products. Sales of telecommunications products and services can be increased by allowing potential customers to sample products and demonstrate features such as call waiting, caller ID and cellular services. Currently, to fully demonstrate services and features, a telephone communications retailer must use the actual telecommunication line. This requires that at least two telephones with appropriate service connections be available for use by the potential customers. If multiple users desire to sample the services or products simultaneously, there must be sufficient phone pairs connected to the public telephone switch network available, increasing the cost and complexity of the demonstration. Allowing potential customers to use the actual services and products ties up equipment needed to provide service to current paying customers.

The present invention obviates the disadvantages that have been noted above using a conventional touch pad of a telephone instrument, through a self contained network, to provide access to a computerized data base which will emulate telephone services and products in a retail premises without connection to the public carrier network.

SUMMARY OF THE INVENTION

It is an object of this invention to provide a method and apparatus for receiving signals through an interface. A decoder transforms the signals into digital data. The digital data is sent to a microcontroller, where it is compared with preprogrammed data. If the digital data matches the preprogrammed data, the microcontroller then sends a command signal to a playback device. The playback device transmits the selected data describing or emulating telephone services in response to the command signal of the microcontroller. If ringing the telephone is appropriate as part of the demonstration, the microprocessor generates a ring signal which is sent to a ring signal generator.

It is a further object of this invention to provide a system for demonstrating telephone capabilities and service which includes a telephone for producing dual tone multiple frequency signals and a telephone interface for sending and receiving signals to and from the dual tone multiple frequency generator. The telephone interface simulates a standard telephone line. A dual tone multiple frequency decoder transforms the dual tone multiple frequency signals from the telephone into digital data which is sent to a microcontroller. The microcontroller has memory containing instructions for comparing signals from the dual tone multiple frequency generator with preprogrammed data in the memory. If there is a match in the comparison the microcontroller produces an output signal which is sent to a data storage and playback device that receives said output signal of said microcontroller and transmits data describing or emulating telephone services in response to the output signal of said microcontroller. The ring generator, upon receiving a signal from the microcontroller sends signals via the telephone interface to cause the telephone to ring.

Various other purposes and advantages of the invention will become clear from its description in the specification that follows. It will be understood that the invention is not limited to the precise embodiment disclosed below and that alternative embodiments and methods will be readily apparent to those skilled in the art without departing from the spirit and scope of the invention as defined in the claims.

BRIEF DESCRIPTION OF THE DRAWINGS

FIG. 3 A table showing the components and performance specifications of the components used in the preferred embodiment of the schematic in FIG. 2.

DESCRIPTION OF THE PREFERRED EMBODIMENT

This invention is directed to a method and apparatus for demonstrating telephone capabilities and services on telephones without the necessity of using actual public carrier circuits. The invention transmits information from the data base to a telephone instrument permitting a potential customer to receive information about the telephone services and options available. The user depresses one or more of the alpha-numerically marked keys on the telephone keypad. This sends a signal from the telephone to a microprocessor which reads the frequency of the tones and commands a pre-programmed data storage and playback device to find, retrieve and send information to the telephone. The pre-programmed data base and playback device provides a normal response transmitted through the telephone receiver to the caller, as audible intelligence response to commands issued from the telephone device.

Modern telephones transmit discrete frequency signals corresponding to the numbers 0 through 9 on the keypad. These frequency signals can be used for data and command inputs for information playback. A 12-button telephone handset, for example, can develop 12 signals corresponding to the numbers 0 through 9, plus the symbols * and #. Pressing on of the keys causes an electronic circuit to generate two tones, hence the term Dual Tone Multiple Frequency (DTMF) signals. There is a low frequency tone for each row on the keypad and a high frequency tone for each column. Thus, it is possible to transmit discrete signals corresponding to the 12 digits and symbols to a playback device. A standard telephone can be used to send signals to activate the emulation system and it is not necessary to purchase a new signaling tone generator. Also, the present invention requires a minimum of additional wiring to the premises when installed.

Figure 1:
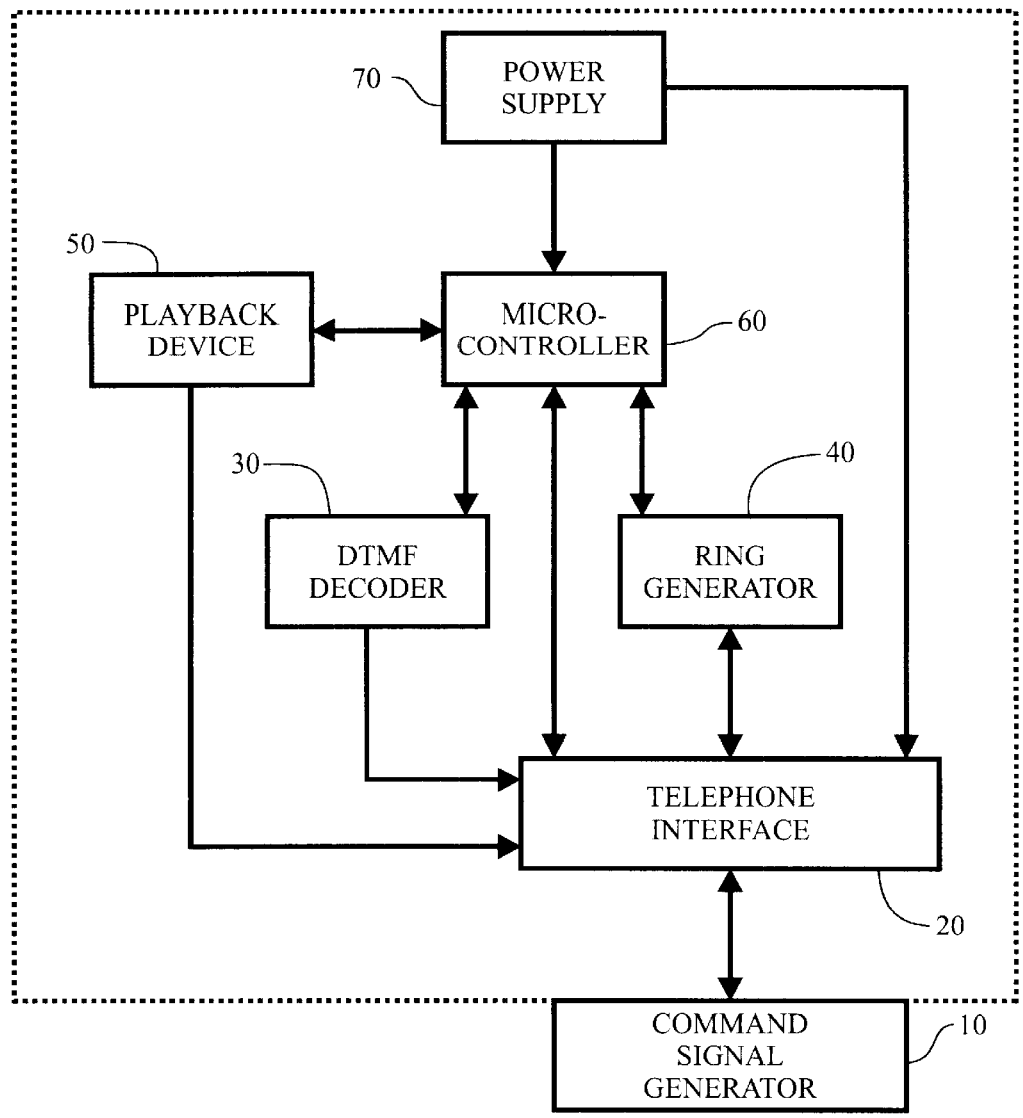
FIG. 1 A block diagram representing the present invention.

FIG. 1 depicts a block diagram showing the components of the claimed invention. A Command Signal generator 10, produces a signal when a keypad is depressed. In the preferred embodiment the Command Signal Generator 10 is a standard telephone. If a standard telephone is used, the signal is sent through the closed telephonic communications network to an interface device, the Telephone Interface (TI) 20. The TI 20 may emulate a standard telephone jack or a wireless telephone service such as cellular or PCS. If a digital signal generator is used, that is not a standard telephone, such as a device which produces digital data directly, then the TI 20 may not be necessary. The TI 20 forwards the digital information to the DTMF Decoder 30. The DTMF Decoder 30 determines the two frequency components of the DTMF signal (high and low frequency) and sends an 8 bit digital signal representing the keypad button that was pressed to generate that signal to the Microcontroller 60. When the system is initially powered up by Power Supply 70, the Microcontroller 60 generates a signal from Read Only Memory (ROM) to Playback Device 50. The Playback Device 50 may be any digital data storage device, such as magnetic tape, a computer disk or hard drive. The preferred embodiment uses a compact disc (CD) player with a standard Integrated Drive Electronics (IDE) interface 47. Upon power up, the Microcontroller 60 sends a signal which initiates the download of data contained in a "control" track on the CD. The control track contains instructions which are read into Random Access Memory (RAM) in Microcontroller 60. The ability to load data from the Playback Device 50 into RAM in microcontroller 60 simplifies the process of updating the system. New storage media, such as a compact disc is relatively inexpensive and easy to produce and can be distributed widely to update the invention to be able to demonstrate new capabilities or features. When a signal is sent from DTMF Decoder 30 to the Microcontroller 60, the microcontroller compares the input signal to the data stored in RAM. The mapping of the input signal from the DTMF Recorder to the data in RAM indicates which track of the CD in the Playback Device 50 is to be used to emulate the corresponding telephone service.

Figure 2A:
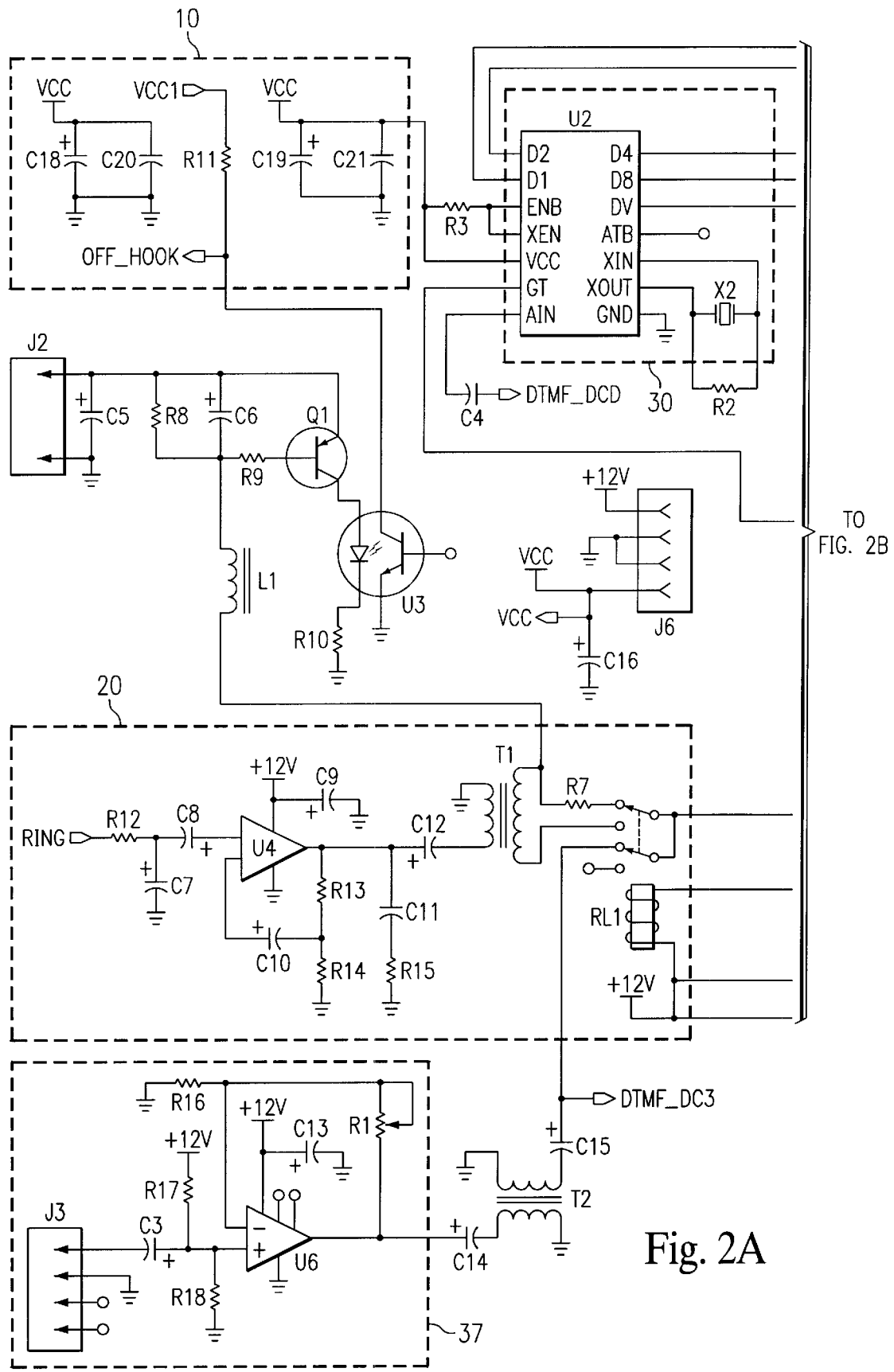
FIG. 2 A schematic of the preferred embodiment of the present invention.
Figure 2B:
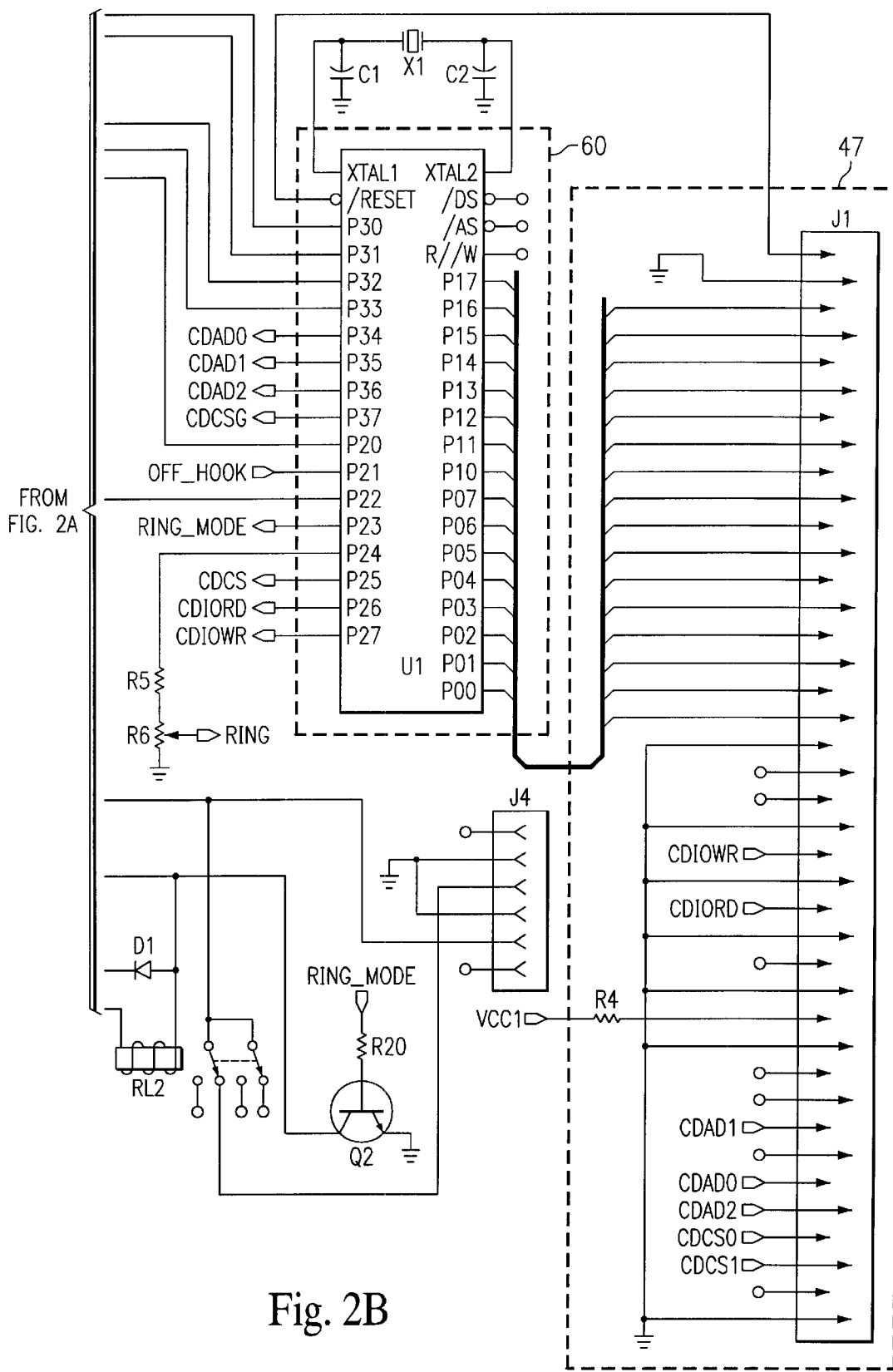
Figure 4:
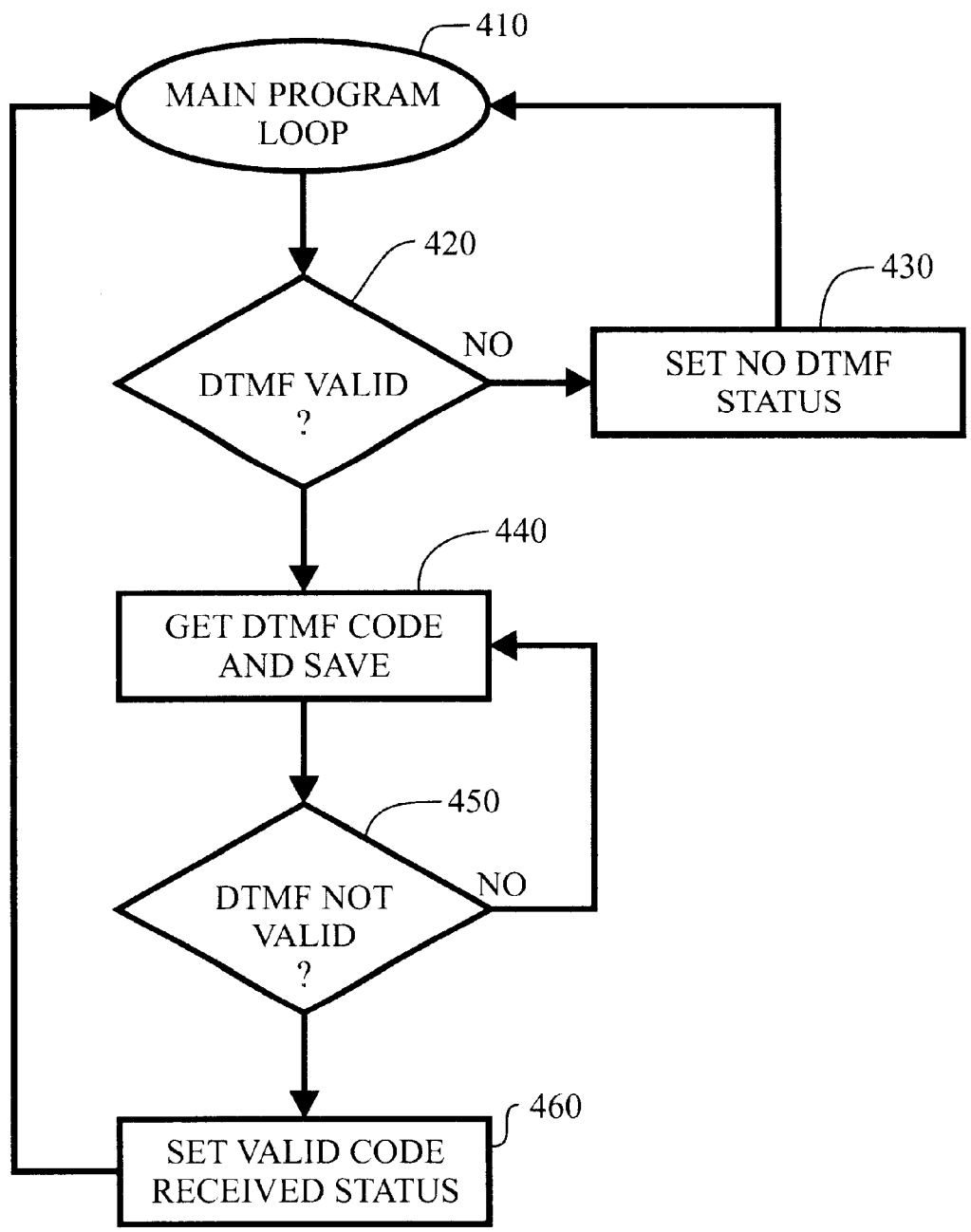
FIG. 4 A flow chart representing the process of getting a valid DTMF code.
Figure 5:
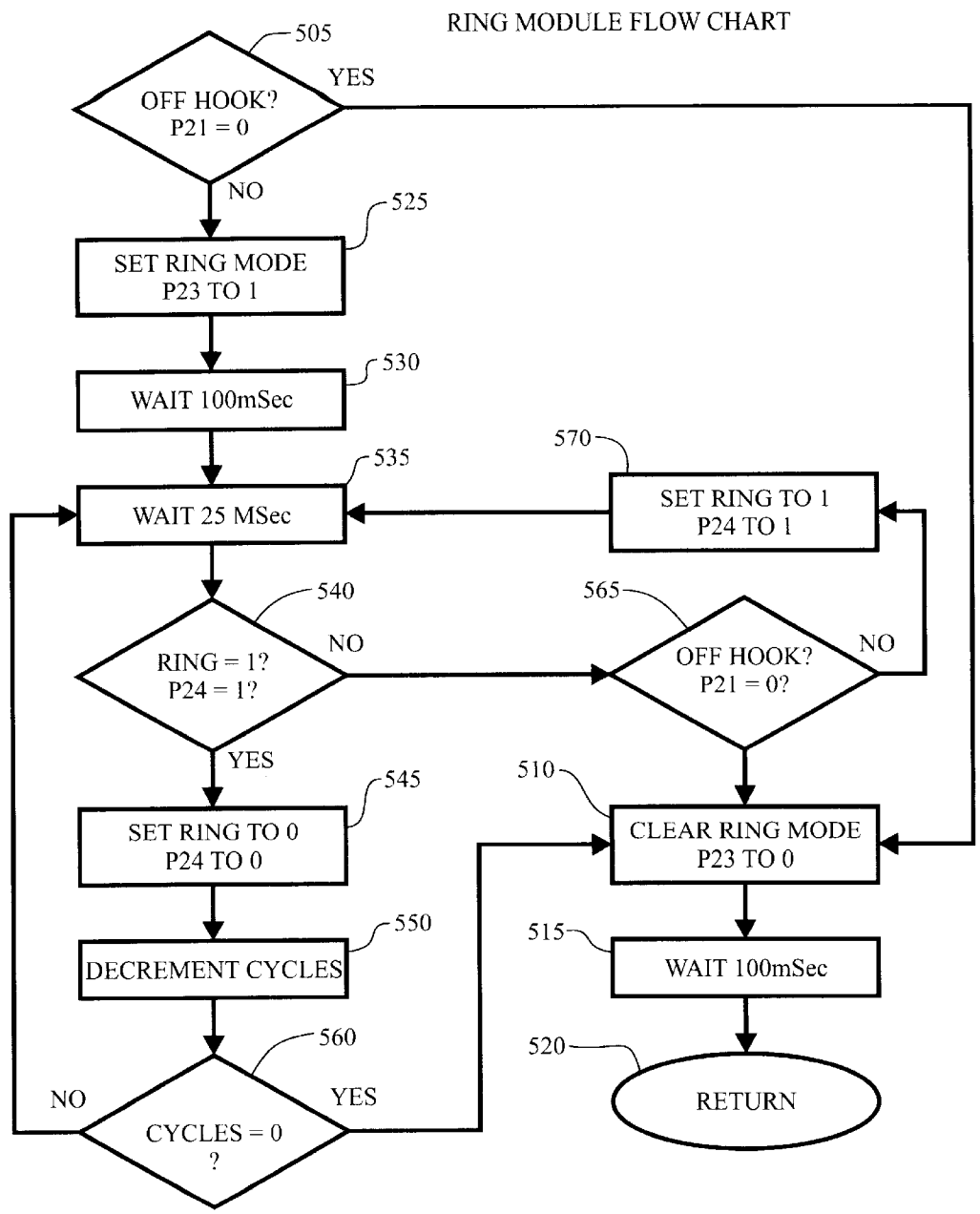
FIG. 5 A flow chart representing the process of inducing a ringing in the demonstration telephone.

FIG. 2 is a wiring schematic of the preferred embodiment of the present invention. The Power Supply 70 powers the DTMF Decoder 30, the Telephone Line Interface 20, and Sound Amplifier 37, which amplifies audio signals from the Playback Device 50 connected to the circuit via the IDE 47 and controlled by Microcontroller 60. FIG. 3 is a table showing the various components and the individual specifications for the wiring diagram in FIG. 2. FIG. 4 is a flow chart representing the logic sequence the DTMF Decoder 30 uses to determine if a valid DTMF code has been received from the TI 20. The DTMF main loop program waits for an input signal 410. If a signal is received the program determines if the code is valid 420, and if not, returns 430 to the main loop 410. If the DTMF signal is valid, the Decoder transforms the DTMF signal into a digital signal and saves the digital signal 440. If the DTMF signal matches a valid code the Microcontroller 60 is notified a valid digital signal is present in the Decoder's 30 memory 460 and sent to the Microcontroller 460 when commanded by the Microcontroller 60. The Microcontroller 60 will compare the digitized DTMF signal with a table stored in RAM. The Microcontroller 60 will then determine which track of the CD in the Playback Device 50 will be played and sent directly to the TI 20. If the demonstration requires a ring signal, the Playback Device 50 sends a command to the Ring Generator 40 to generate a signal which will cause the Command Signal Generator 10 to ring. FIG. 5 is a flow diagram of the logic used in the Ring Generator 40 to induce the Command Signal Generator 10 to ring. The program first determines if the Command Signal Generator is off hook 505. If it is the ring mode is cleared 510, the program waits 100 milliseconds 515 and the program returns to step 505. If the Command Signal Generator is not off hook, the ring mode counter is increased by one 525, the program waits 125 milliseconds 530, 535 and then the ring signal is sent 540. The ring command is then set to off (0) 545, and the predetermined number of ring cycles is decremented by one 550. If the number of cycles remaining is zero the program goes to step 510. If there are cycles remaining, the program goes to step 535 to wait 25 milliseconds. Next the ring status is checked at step 540 and if the ring status was set to 0 at 545, the program checks to determine if the Command Signal Generator 10 is off hook 565. If the Command Signal Generator is hook the program proceeds to step 510 to return to the beginning. If the Command Signal Generator is not off hook the program proceeds to step 570 where the ring command is set to on (1) and the program executes another ring cycle, which will be repeated the Command Signal Generator 10 is off hook of the number of ring cycles left is zero.

The following describes one possible demonstration sequence. A customer approaches a display with a standard push button telephone or cordless telephone. A placard instructs the customer to lift the handset on the telephone or push the talk button on the cordless telephone or wireless telephone. When the customer lifts the handset the TI 20 detects the "off hook" signal which is sent to Microcontroller 60 as a digitized signal. The Microcontroller 60 following instructions in ROM, compares the signal against a table stored in RAM. The "off hook" signal indicates the "track" having the "welcome" message should be played. The Playback Device 50 then proceeds to play the the audio welcome message through the TI 20 to the Command Signal Generator 10. At the conclusion of the welcome message, the customer is invited to press a key on the Command Signal Generator 10 to demonstrate a telephone service or feature. If the customer selects caller identification, the audio track will instruct the customer to hang up the telephone. The Microcontroller 60 will instruct the Ring Generator 40 to send a ring signal via TI 20. Once the ring signal has been sent, the Microcontroller 60 will instruct the Playback Device 50 to send the information necessary to display caller identification information, which is typically transmitted as frequency shift keying. The demonstration will end after a predetermined number of rings or if the Command Signal Generator 10 goes off hook. Once the demonstration is complete, the customer can pick up the telephone handset again and press another key for a demonstration of other services or telephone product features or use another telephone to compare the same feature on a second telephone. The type of services and features that can be demonstrated via this apparatus and method span the full gamut of telephony. Those skilled in the art will be able to program the Playback Device with all necessary signals to emulate telephony features such as Caller ID, Call Waiting and fax machine by recording audio information on the playback device which simulates the appropriate data. Wireless, communications can also be demonstrated. An adapter may be attached to the antenna socket of a wireless telephone which is linked to an analog to digital converter, if the telephone is not digital. The Decoder includes the appropriate multiplexer circuitry (such as Time Domain, Frequency Domain, or Code Division Multiple Access) for the telephones being demonstrated. The output signal of the telephone is sent directly to the emulator and not through the airwaves. The return signals are coded and sent to the telephone in the reverse process.

We claim:

1. An emulator for demonstrating and describing telephone services and features in response to DTMF commands received from a command signal generator, comprising:

a standard telephone interface for sending and receiving command signals to and from a command signal generator, including DTMF signals;

a microcontroller with memory, said memory containing preprogrammed data and instructions for comparing said command signals with preprogrammed data in said memory, said microcontroller producing an output signal if said command signal matches said preprogrammed data, and a data storage and playback device wherein said data storage and playback device receives said output signal and transmits information describing or emulating telephone services in response to said output signal, and according to standard telephone line interface signaling standards.

2. An emulator for demonstrating and describing telephone services and features in response to DTMF commands received from a command signal generator, comprising:

a standard telephone interface for sending and receiving command signals to and from a command signal generator, including DTMF signals;

a microcontroller with memory, said memory containing preprogrammed data and instructions for comparing said command signals with preprogrammed data in said memory, said microcontroller producing an output signal if said command signal matches said preprogrammed data;

a data storage and playback device wherein said data storage and playback device receives said output signal and transmits information describing or emulating telephone services in response to said output signal;

wherein said command signal generator is a telephone, said telephone providing a dual tone multiple frequency signal;

wherein said telephone interface simulates a standard telephone line, and a dual tone multiple frequency decoder wherein said dual tone multiple frequency signals from said telephone are transformed by said dual tone multiple frequency decoder into digital data which is sent to said microcontroller.

3. The communications emulator of claim 2 further comprising:

a ring generator, wherein said ring generator upon receiving a signal from said microcontroller sends signals via said telephone interface to cause said telephone to ring.

4. A method of demonstrating a telephone product connected to an emulator, through a standard telephone interface, capable of generating commands comprising the steps of:

detecting a telephone product going off hook;

listening for DTMF commands from said telephone product;

decoding said DTMF commands; and performing a microcontroller routine to emulate specific telephone services or communications corresponding to said DTMF commands, which comprises playing an audio recording instructing a user of said telephone product to maintain the off hook condition of said telephone product, sending a call waiting sequence to said telephone product, sending caller ID information to said telephone product, and detecting said telephone product going momentarily on hook, playing an audio recording simulating a message from a call waiting party, detecting said telephone product going momentarily on hook, and playing an audio recording simulating a message from an original calling party.

5. A method of demonstrating a telephone product connected to an emulator, through a standard telephone interface, capable of generating commands comprising the steps of:

detecting a telephone product going off hook;

listening for DTMF commands from said telephone product;

decoding said DTMF commands; and performing a microcontroller routine to emulate specific telephone services or communications corresponding to said DTMF commands, which comprises playing an audio recording instructing the user to go on hook with said telephone product, sending a ring sequence to said telephone product, detecting said telephone product going off hook, playing an audio recording of a sending fax machine handshake sequence, detecting a receiving fax machine handshake sequence from said telephone product, playing an audio recording of a fax being sent, and going on hook upon completion of playing back said audio recording of said fax being sent.

6. An emulator for demonstrating and describing telephone services and features in response to DTMF commands received from a telephone instrument, comprising:

a telephone interface which simulates a standard telephone line interface without using public carrier circuits;

a DTMF decoder coupled to said telephone interface and operable to convert DTMF signals received from the telephone instrument to digital data;

a microcontroller coupled to said DTMF decoder and operable to receive said digital data therefrom, and operable to compare said received digital data with preprogrammed data, said controller operable to output command signals in accordance with the comparison results, and a playback device coupled to receive said command signals from said controller, said playback device operable to select, and output to said telephone interface, information describing or emulating telephone services in accordance with said command signals and according to standard telephone line interface signaling standards.

7. The apparatus of claim 6, and wherein said playback device is a digital storage device.

8. The apparatus of claim 6, and wherein said playback device is a compact disk player.

9. The apparatus of claim 8, and wherein said playback device is operable to select a track on a compact disc in response to said command signal.

10. The apparatus of claim 6, and wherein said playback device is a computer hard drive.

11. The apparatus of claim 6, and wherein said playback device is a magnetic tape player.

12. The apparatus of claim 6, further comprising a command signal generator coupled to said telephone interface.

13. The apparatus of claim 12, and wherein said command signal generator is coupled to said telephone interface through a closed telephonic communications network.

14. The apparatus of claim 12, and wherein said command signal generator is a standard telephone instrument having a DTMF generator.

15. The apparatus of claim 6, further comprising:

a ring generator having an input coupled to said microcontroller for receiving command signals therefrom, and having an output coupled to said telephone interface, said ring generator responsive to certain command signals to generate a ring signal at said output.

16. A method for emulating telephonic communications comprising:

receiving a DTMF signal without using public carrier circuits at a telephone interface that simulates a standard telephone line;

transforming said DTMF signal into digital data;

comparing said digital data with preprogrammed data;

sending a command signal to a playback device if said digital data matches said preprogrammed data, and transmitting data from said playback device to said telephone interface describing or emulating telephone services in response to said command signal, and according to standard telephone line interface signaling standards.

17. The method of claim 16, and wherein said playback device is a digital storage device.

18. The method of claim 16, and wherein said playback device is a compact disk player.

19. The method of claim 18, further comprising the step of:

selecting a track on a compact disc in response to said command signal.

20. The method of claim 16, and wherein said playback device is a computer hard drive.

21. The method of claim 16, and wherein said playback device is a magnetic tape player.

22. The method of claim 16, and wherein said DTMF signal is received from a command signal generator coupled to said telephone interface.

23. The method of claim 22, and wherein said command signal generator is a standard telephone instrument having a DTMF generator.

24. The method of claim 16, and wherein said DTMF signal is received from said command signal generator through a closed telephonic communications network.

25. The method in claim 16, further comprising the step of:

generating a ring signal when a ring signal generator receives a generate ring command signal.

* * * * *